UNITED STATES PATENT OFFICE.

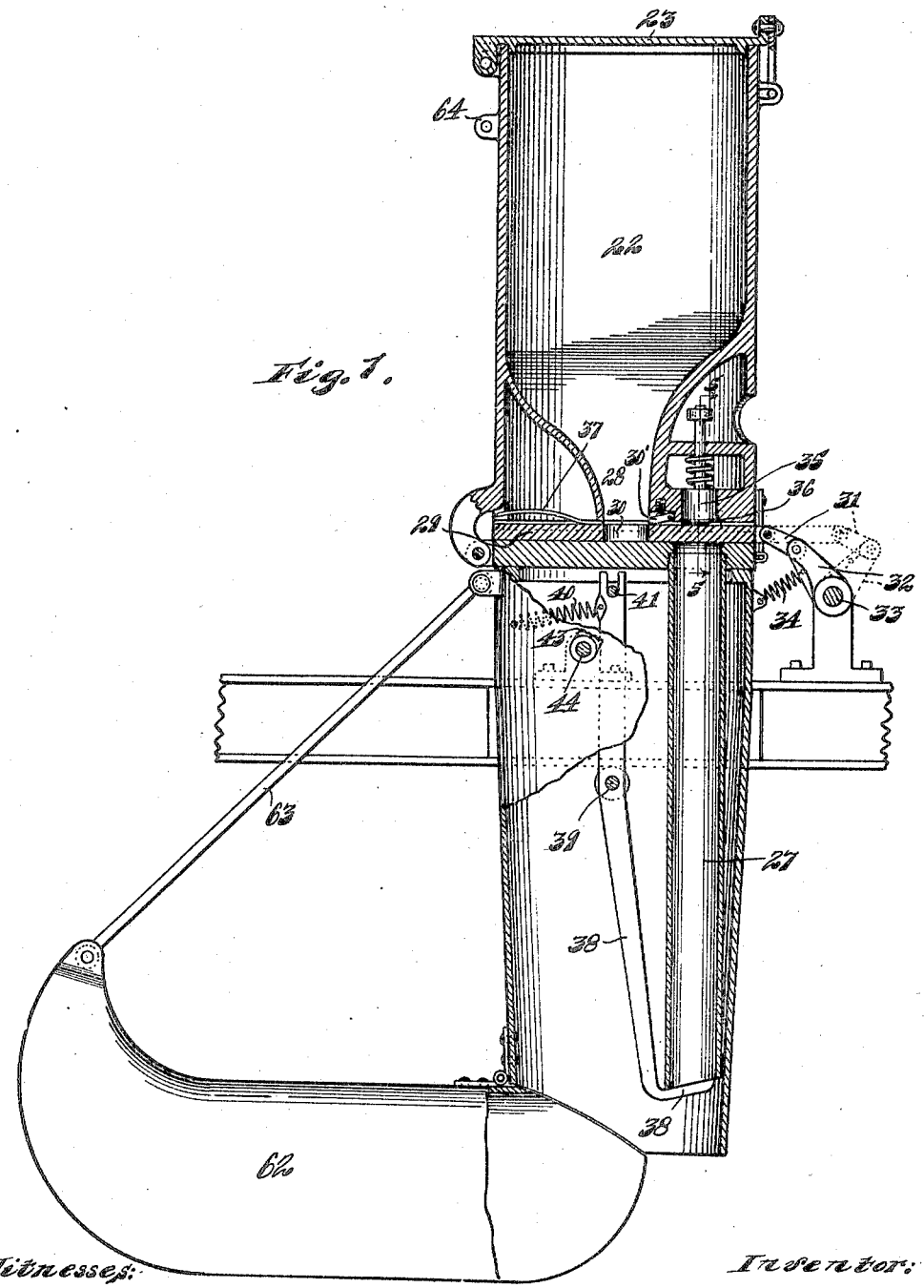

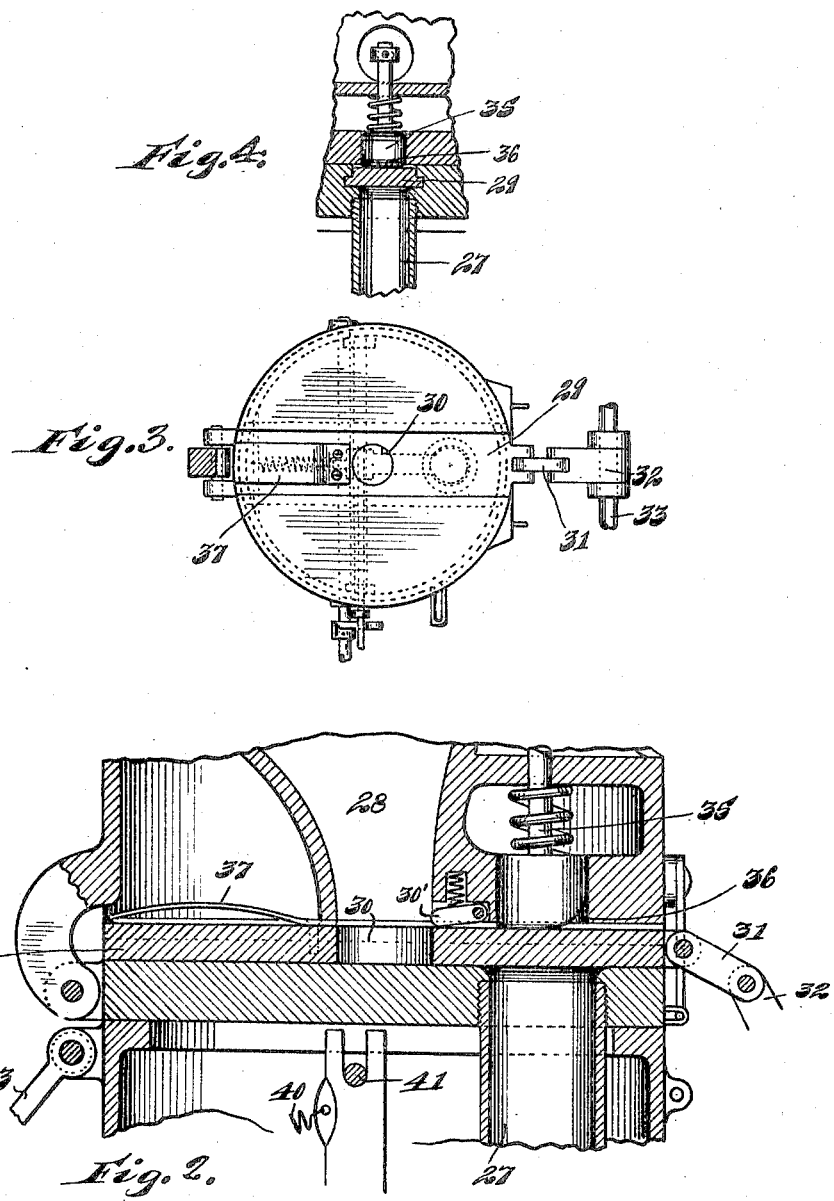

GEORGE O. HOPPE, OF CHARLOTTE, ILLINOIS.

SEED-PLANTING MACHINE.

1,284,107. Specification of Letters Patent. Patented Nov. 5, 1918.

Application filed August 28, 1917. Serial No. 188,574.

*To all whom it may concern:*

Be it known that I, GEORGE O. HOPPE, a citizen of the United States, and a resident of the town of Charlotte, county of Livingston, and State of Illinois, have invented certain new and useful Improvements in Seed-Planting Machines, of which the following is a specification.

My invention relates to improvements in seed planting machines, especially designed for use in planting corn, and has for its object the production of a device of this character, which will be of durable and economical construction and efficient in use.

The invention consists in the combinations and arrangements of parts hereinafter described and claimed.

The invention will be best understood by reference to the accompanying drawings forming a part of this specification, and in which, Figure 1, an enlarged vertical section taken through discharge mechanism employed in the construction.

Fig. 2, a still further enlarged vertical section taken through the lower end of the discharge hopper.

Fig. 3 a horizontal section of the discharge mechanism, and

Fig. 4, a section taken on line 5—5 of Fig. 1.

The preferred form of construction, as illustrated in the drawings, comprises a seed depositing mechanism comprising a hopper 22, which is provided at its upper end with a hinged cover 23. The lower end of each hopper is hinged at 24 to the upper end of a support 25, which is supported by the frame 13. A suitable locking device 26 coöperates with each hopper 22 to lock the same against pivotal movement relative to the corresponding supporting member 25. Arranged in each of the members 25 is a seed discharge tube 27, the arrangement being such that the open upper end of the tube 27 is arranged out of alinement with the discharge opening 28 of the corresponding hopper.

Arranged at the lower end of each hopper is a shiftable plate 29, having an opening 30 therein adapted, upon shifting of said plate, to be brought into successive registration with the corresponding opening 28 and the upper end of discharge pipe 27. The arrangement is such that in the operation of the machine, when the hopper is filled with seed, as the plate 29 is brought to a position with the opening 30 therein registering with opening 28, a number of seeds will drop into said opening 30, and, upon shifting of the plate, will be carried thereby to and discharged into pipe 27. Hence, with this arrangement, upon each complete reciprocation of the plate 29, a number of seeds will be withdrawn from the corresponding hopper and conveyed and dropped into the corresponding pipe 27.

In order to depress the upwardly projecting ends of any grains or seeds which might become so arranged in the opening 30, I provide an upwardly yieldable spring held scraper member or leaf 30' arranged to contact with any such upwardly projecting ends of grains or seeds and turn them downwardly to permit of their ready passage to the discharge pipe 27. Actuation of the plates 29 is effected by means of links 31 which connect the same with rocker arms 32, provided upon a transversely extending oscillator 33. A helical tension spring 34 serves to normally hold plates 29 at their forward terminals of movement, that is, with the openings 30 thereof in registration with the openings of hoppers 22. Coöperating with each plate 29 is a spring pressed plunger 35 adapted, when the opening 30 in the plate reaches a position in registration with the corresponding pipe 27, to enter said opening and push any seeds which may lodge in said opening downwardly into the pipe 27. An effective means is thus provided for preventing clogging of the plates 29, which might otherwise occur. The rearward side of each plunger 35 is beveled as at 36 in order to effect automatically the raising of the same by the corresponding plate 29 when the latter is moved forwardly. Carried by each plate 29 is a leaf spring 37 adapted upon rearward shifting of the former to register with the lower end of the corresponding hopper and thus insure the prevention of any discharge therefrom when the plate is moved rearwardly.

Coöperating with the lower end of each of the discharge pipes 27 is a closure 38 fulcrumed at 39 in the corresponding member 25. With each closure 38 coöperates a spring 40 for normally holding the same in closing position. Rocking of the closures 38 to open position is effected by means of a rod 41 which extends across the machine through arcuate slots 42, formed in adjacent sides of the members 25, the ends of said rod resting in the bifurcated upper ends of the shanks of closures 38. The rod 41 is carried at the outer ends of the rocker arms 43 which are fixed to an oscillatory shaft 44, the arrangement being such, as is apparent, that oscillation of said shaft will effect actuation or movement of the closures 38.

It is of course apparent that the distance between the hills of seeds planted will be determined by the length of the chain and by varying the length of the latter, the space between the seed hills may also be varied, or if desired the chain may be provided with a greater number of tappets spaced thereon.

The lower ends of the housings or supports 25 of the seed depositing devices are provided with shoes 62 of conventional form for forming grooves or furrows in the ground to receive the seeds. The members 62 are hinged to the housing 25, brace rods 63 serving to hold the same in operative position. When desired the front ends of shoes 62 may be released and swung to elevated or inoperative position by releasing the upper ends of rods 63 and engaging the same with supplemental lugs 64 provided at the front sides of hoppers 22.

While I have illustrated and described the preferred forms of construction for carrying my invention into effect, these are capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. In a seed planter, the combination of a frame; seed depositing means carried by said frame, said depositing means comprising a hopper having a discharge opening at its lower end; a substantially vertically disposed seed passage having its upper end terminating adjacent said discharge opening but out of registration therewith; a shiftably mounted plate arranged at the discharge opening of said hopper and having an opening therein adapted, upon shifting of said plate, to successively register with said hopper discharge opening and the upper end of said discharge passage; and a plunger adapted to enter the opening in said plate when the latter opening is brought into registration with said discharge passage, said plunger being beveled at one side to insure automatic movement of said plunger from engagement with said opening upon return movement of said plate, substantially as described.

2. In a seed planter, the combination of a frame; seed depositing means carried by said frame, said depositing means comprising a hopper having a discharge opening at its lower end; a substantially vertically disposed seed passage having its upper end terminating adjacent said discharge opening but out of registration therewith; a shiftably mounted plate arranged at the discharge opening of said hopper and having an opening therein adapted, upon shifting of said plate, to successively register with said hopper discharge opening and the upper end of said discharge passage; and a spring pressed plunger adapted to automatically enter the opening in said plate when the latter opening is brought into registration with said discharge passage, said plunger being beveled at one side to insure automatic retraction thereof against the pressure of said spring upon return movement of said plate, substantially as described.

In testimony whereof I have signed my name to this specification in the presence of two subscribing witnesses.

GEORGE O. HOPPE.

Witnesses:
H. W. DASSERE,
FRANK H. HERR.

Copies of this patent may be obtained for five cents each, by addressing the "Commissioner of Patents, Washington, D. C."